United States Patent
Kobayashi et al.

(10) Patent No.: US 7,550,536 B2
(45) Date of Patent: Jun. 23, 2009

(54) ACRYLIC RUBBER, PROCESS FOR ITS PRODUCTION, AND RUBBER COMPOSITIONS, OIL-AND WEATHER-RESISTANT RUBBER COMPOSITIONS, AND OIL-AND WEATHER-RESISTANT RUBBERS, CONTAINING THE SAME

(75) Inventors: Nobutoshi Kobayashi, Mie (JP); Minoru Tsuneyoshi, Mie (JP); Katsutaka Yokoi, Mie (JP)

(73) Assignee: JSR Corporation, Tokyo (JP)

( * ) Notice: Subject to any disclaimer, the term of this patent is extended or adjusted under 35 U.S.C. 154(b) by 250 days.

(21) Appl. No.: 10/498,972

(22) PCT Filed: Dec. 25, 2002

(86) PCT No.: PCT/JP02/13551

§ 371 (c)(1),
(2), (4) Date: Mar. 18, 2005

(87) PCT Pub. No.: WO03/055925

PCT Pub. Date: Jul. 10, 2003

(65) Prior Publication Data

US 2005/0165191 A1    Jul. 28, 2005

(30) Foreign Application Priority Data

Dec. 25, 2001    (JP) ............................. 2001-392811

(51) Int. Cl.
*C08L 33/08* (2006.01)
*C08L 33/10* (2006.01)
*C08L 33/20* (2006.01)

(52) U.S. Cl. ................. 525/222; 525/210; 525/223; 525/224; 525/232; 525/238

(58) Field of Classification Search ............ 525/210, 525/222, 223, 224, 232, 238
See application file for complete search history.

(56) References Cited

U.S. PATENT DOCUMENTS 4,912,186 A * 3/1990 Ohhara et al. ............... 526/323
6,054,531 A * 4/2000 Craig .......................... 525/64
6,683,133 B1 * 1/2004 Gorrissen et al. ............ 525/63

FOREIGN PATENT DOCUMENTS

| | | |
|---|---|---|
| JP | 50-94063 | 7/1975 |
| JP | 53-023342 | 3/1978 |
| JP | 55-104332 | 8/1980 |
| JP | 57-025342 | 2/1982 |
| JP | 57-119943 | 7/1982 |
| JP | 61-44909 | 3/1986 |
| JP | 61-225243 | 10/1986 |
| JP | 62-59650 | 3/1987 |
| JP | 62-68842 | 3/1987 |
| JP | 62-280244 | 12/1987 |
| JP | 63-68613 | 3/1988 |
| JP | 1-252609 | 10/1989 |
| JP | 1-297451 | 11/1989 |
| JP | 8-41271 | 2/1996 |
| JP | 8-100084 | 4/1996 |
| JP | 8-100084 A * | 4/1996 |

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

The objective of the present invention is to provide an acrylic ester-based copolymer rubber which gives a rubber product excellent in fuel oil resistance and tensile strength and which is crosslinkable with sulfur and/or an organic peroxide and to provide a process for producing the same, as well as a rubber composition, an oil-resistant and weather-resistant rubber composition, and an oil-resistant and weather-resistant rubber product. The acrylic ester-based copolymer rubber of the present invention comprises a structural unit derived from at least one monomer selected from the group consisting of an acrylic acid alkyl ester and an acrylic acid alkoxyalkyl ester in an amount from 40 to 91.9% by mass, a structural unit derived from an unsaturated nitrile monomer in an amount from 8 to 40% by mass, and a structural unit derived from at least one monomer selected from the group consisting of a non-conjugated cyclic polyene and a compound having a specific structure in an amount from 0.1 to 20% by mass (provided 100% by mass of total of these), and has a Mooney viscosity [$ML_{1+4}(100°\ C.)$] in the range from 10 to 200.

6 Claims, No Drawings

ACRYLIC RUBBER, PROCESS FOR ITS PRODUCTION, AND RUBBER COMPOSITIONS, OIL-AND WEATHER-RESISTANT RUBBER COMPOSITIONS, AND OIL-AND WEATHER-RESISTANT RUBBERS, CONTAINING THE SAME

TECHNICAL FIELD

The present invention relates to an acrylic ester-based copolymer rubber and a process for producing the same; and a rubber composition, an oil-resistant and weather-resistant rubber composition, and an oil-resistant and weather-resistant rubber product. More specifically, it relates to an acrylic ester-based copolymer rubber which provides a rubber product excellent in fuel oil resistance and tensile strength and which is crosslinkable with sulfur and/or an organic peroxide and to a process for producing the same, as well as a rubber composition, an oil-resistant and weather-resistant rubber composition, and an oil-resistant and weather-resistant rubber product.

BACKGROUND ART

An unsaturated nitrile-conjugated diene-based rubber has been so far known as a rubber excellent in oil resistance, however, using only of this rubber had an inferior in weather resistance, especially in ozone resistance because a main chain has a double bond.

In order to improve the weather resistance, a rubber comprising an unsaturated nitrile-conjugated diene-based rubber and polyvinyl chloride (disclosed in JP-A-50-94063 and the like), a rubber comprising an unsaturated nitrile-conjugated diene-based rubber and a chlorinated polyethylene (disclosed in JP-A-57-119943 and the like) and a blend comprising an acrylic rubber and an ethylene-α-olefin-based copolymer (disclosed in JP-A-62-280244, JP-A-62-59650, JP-A-53-23342 and the like) have been known.

When the former rubber is used, oil resistance and weather resistance are excellent, however, containing a halogen causes to a releasing of a toxic gas by combustion, the use of a halogen has been restrained in recent years. Therefore, a halogen-free rubber excellent in oil resistance and weather resistance has been in demand.

In addition, when the latter rubber is used, weather resistance, particularly ozone resistance is excellent, but inferior in oil resistance. Thus, it can not be said that the latter rubber has a good balance to be excellent in oil resistance, weather resistance and mechanical properties.

Moreover, blending of an elastomer has provided new characteristics or has improved various characteristics, and a vulcanized rubber composition blended with an α,β-unsaturated nitrile-conjugated diene-based copolymer and an acrylate-based copolymer has been known (disclosed in JP-A-55-104332, JP-A-57-25342, JP-A-1-297451 and the like). However, it can not be also said that this rubber composition has a good balance to be excellent in oil resistance, fuel oil resistance, weather resistance and mechanical properties.

Accordingly, a halogen-free rubber product excellent in weather resistance, oil resistance and strengths with a good balance and a rubber composition that provides the same has been required.

An acrylic rubber is a copolymer of an acrylic acid ester as a main component and a monomer to form a crosslinking point. It has generally been known as a rubber that provides a rubber product excellent in thermal resistance, oil resistance and ozone resistance, and has been used as a molding material of an oil seal, an O-ring, a packing and the like. In recent years, accompanying with a higher performance of automobiles, required properties cannot be satisfied with ordinary levels of thermal resistance, oil resistance and cold resistance of rubber materials, and a development of a rubber having higher properties has been in demand. For example, since rubber parts are used at higher temperatures, a fuel oil-resistant rubber material excellent in thermal resistance has been required. Moreover, with respect to a seal material, it has been strongly required to improve thermal resistance, compression set and water resistance. Generally, a crosslinkable acrylic rubber includes a rubber using a monomer having active chlorine as a constituent or a rubber using a monomer having an epoxy group as a constituent to form a crosslinking point, however, a rubber by a monomer having active chlorine leads to a crosslinked material problematic in compression set, metal corrosion resistance and the like. A rubber by a monomer having an epoxy group had a low crosslinking rate, being problematic. Various crosslinkable monomers other than these monomers have been studied, however, when a conjugated diene monomer such as butadiene and pentadiene are used, a crosslinking reaction occurs during polymerization and no good polymer is obtained.

An acrylic rubber from an acrylic acid alkyl ester as a main constituent is quite inferior in fuel oil resistance to a nitrile rubber, a fluororubber, a hydrin rubber, a hydrogenated nitrile rubber and the like, and it could not be used in a portion in contact with fuel oil.

DISCLOSURE OF THE INVENTION

The objective of the present invention is to provide a novel acrylic copolymer rubber containing no halogens and being able to lead to a rubber product which has oil resistance and thermal resistance, is excellent in fuel oil resistance and mechanical strengths and is low in compression set and to provide a process for producing the same, as well as a rubber composition, an oil-resistant and weather-resistant rubber composition, and an oil-resistant and weather-resistant rubber product.

The present inventors have assiduously conducted investigations to achieve the objective, and have consequently found that a use of a monomer to form a specific crosslinking point and an unsaturated nitrile monomer as constituent monomer components provides a resulting vulcanized rubber composition having excellent properties. This finding has led to the completion of the invention.

That is, the present invention provides the following acrylic ester-based copolymer rubber and a process for producing the same, as well as a rubber composition, an oil-resistant and weather-resistant rubber composition, and an oil-resistant and weather-resistant rubber product.

1. An acrylic ester-based copolymer rubber characterized by comprising:

(A) a structural unit derived from at least one monomer selected from the group consisting of an acrylic acid alkyl ester and an acrylic acid alkoxyalkyl ester in an amount from 40 to 91.9% by mass, (B) a structural unit derived from an unsaturated nitrile monomer in an amount from 8 to 40% by mass, and (C) a structural unit derived from at least one monomer selected from the group consisting of a non-conjugated cyclic polyene and compounds represented by the following general formulas (1) and (2) in an amount from 0.1 to 20% by mass (provided (A)+(B)+(C)=100% by mass), wherein the Mooney viscosity [$ML_{1+4}(100°\ C.)$] is in the range from 10 to 200,

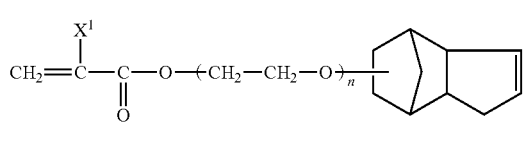
(1)

wherein $X^1$ represents a hydrogen atom or a methyl group, and n is an integer from 0 to 10,

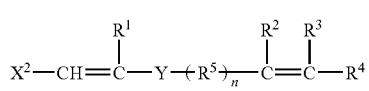
(2)

wherein $R^1$ represents a hydrogen atom or a methyl group, $R^2$, $R^3$ and $R^4$ each represent a hydrogen atom or an organic group having from 1 to 10 carbon atoms where hydrogen atom is not bonded to carbon atom adjacent to a double bond, $R^5$ represents an organic group having from 1 to 10 carbon atoms where hydrogen atom is not bonded to carbon atom adjacent to a double bond, $X^2$ represents a hydrogen atom, —$COOR^6$ wherein $R^6$ represents an alkyl group having from 1 to 10 carbon atoms or an alkoxyalkyl group having from 2 to 14 carbon atoms, or a group represented by following formula (3),

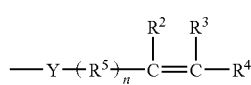
(3)

wherein Y represents

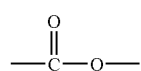

or —O—, and n is 1 or 0.

2. The acrylic ester-based copolymer rubber according to claim 1, wherein a monomer forming the structural unit (A) is at least one selected from the group consisting of ethyl acrylate, n-butyl acrylate and methoxyethyl acrylate.

3. The acrylic ester-based copolymer rubber according to claim 1, further comprising (D) a structural unit derived from an unsaturated monomer having an epoxy group in an amount from 0.1 to 20 parts by mass when the total of the structural units (A), (B) and (C) is defined as 100 parts by mass.

4. A process for producing an acrylic ester-based copolymer rubber characterized by copolymerizing monomers comprising (a) at least one kind of monomer selected from an acrylic acid alkyl ester and an acrylic acid alkoxyalkyl ester in an amount from 40 to 91.9% by mass, (b) an unsaturated nitrile monomer in an amount from 8 to 40% by mass, and (c) at least one kind of monomer selected from the group consisting of a non-conjugated cyclic polyene and compounds represented by the following general formulas (1) and (2) in an amount from 0.1 to 20% by mass (provided (a)+(b)+(c)=100% by mass) in the presence of a radical polymerization initiator,

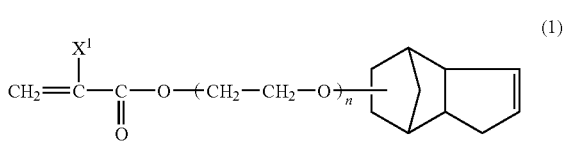
(1)

wherein $X^1$ represents a hydrogen atom or a methyl group, and n is an integer from 0 to 10,

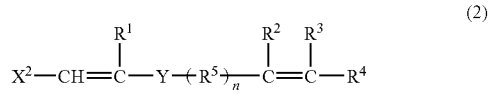
(2)

wherein $R^1$ represents a hydrogen atom or a methyl group, $R^2$, $R^3$ and $R^4$ each represent a hydrogen atom or an organic group having from 1 to 10 carbon atoms where hydrogen atom is not bonded to carbon atom adjacent to a double bond, $R^5$ represents an organic group having from 1 to 10 carbon atoms where hydrogen atom is not bonded to carbon atom adjacent to a double bond, $X^2$ represents a hydrogen atom, —$COOR^6$ wherein $R^6$ represents an alkyl group having from 1 to 10 carbon atoms or an alkoxyalkyl group having from 2 to 14 carbon atoms, or a group represented by following formula (3),

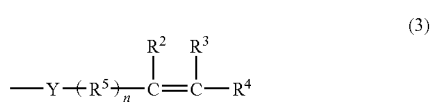
(3)

wherein Y represents

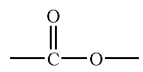

or —O—, and n is 1 or 0.

5. A rubber composition characterized by comprising an acrylic ester-based copolymer rubber, sulfur and/or an organic peroxide, wherein the acrylic ester-based copolymer rubber is comprised of:

(A) a structural unit derived from at least one monomer selected from the group consisting of an acrylic acid alkyl ester and an acrylic acid alkoxyalkyl ester in an amount from 40 to 91.9% by mass, (B) a structural unit derived from an unsaturated nitrile monomer in an amount from 8 to 40% by mass, and (C) a structural unit derived from at least one monomer selected from the group consisting of a non-conjugated cyclic polyene and compounds represented by the following general formulas (1) and (2) in an amount from 0.1 to 20% by mass (provided (A)+(B)+(C)=100% by mass), wherein the Mooney viscosity [$ML_{1+4}(100°\ C.)$] of the acrylic ester-based copolymer rubber is in the range from 10 to 200,

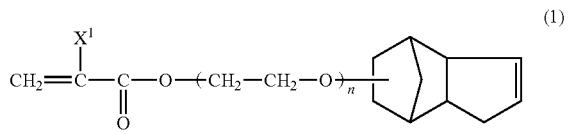
(1)

wherein $X^1$ represents a hydrogen atom or a methyl group, and n is an integer from 0 to 10,

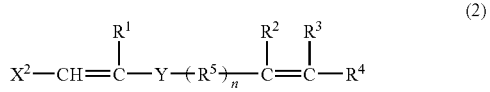
(2)

wherein $R^1$ represents a hydrogen atom or a methyl group, $R^2$, $R^3$ and $R^4$ each represent a hydrogen atom or an organic group having from 1 to 10 carbon atoms where hydrogen atom is not bonded to carbon atom adjacent to a double bond, $R^5$ represents an organic group having from 1 to 10 carbon atoms where hydrogen atom is not bonded to carbon atom adjacent to a double bond, $X^2$ represents a hydrogen atom, —$COOR^6$ wherein $R^6$ represents an alkyl group having from 1 to 10 carbon atoms or an alkoxyalkyl group having from 2 to 14 carbon atoms, or a group represented by following formula (3),

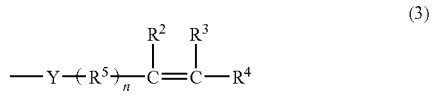
(3)

wherein Y represents

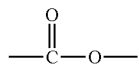

or —O—, and n is 1 or 0.

6. An oil-resistant and weather-resistant rubber composition characterized by comprising (X) an acrylic ester-based copolymer rubber in an amount from 10 to 50% by mass and (Y) α,β-unsaturated nitrile. conjugated diene copolymer in an amount from 90 to 50% by mass (provided (X)+(Y)=100% by mass), wherein the acrylic ester-based copolymer rubber is comprised of:

(A) a structural unit derived from at least one monomer selected from the group consisting of an acrylic acid alkyl ester and an acrylic acid alkoxyalkyl ester in an amount from 40 to 91.9% by mass, (B) a structural unit derived from an unsaturated nitrile monomer in an amount from 8 to 40% by mass, and (C) a structural unit derived from at least one monomer selected from the group consisting of a non-conjugated cyclic polyene and compounds represented by the following general formulas (1) and (2) in an amount from 0.1 to 20% by mass (provided (A)+(B)+(C)=100% by mass), wherein the Mooney viscosity $[ML_{1+4}(100°\ C.)]$ of the acrylic ester-based copolymer rubber is in the range from 10 to 200,

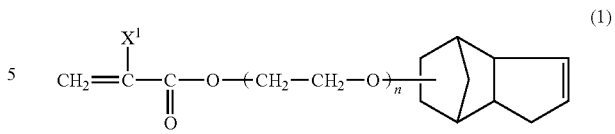
(1)

wherein $X^1$ represents a hydrogen atom or a methyl group, and n is an integer from 0 to 10,

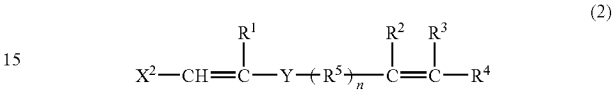
(2)

wherein $R^1$ represents a hydrogen atom or a methyl group, $R^2$, $R^3$ and $R^4$ each represent a hydrogen atom or an organic group having from 1 to 10 carbon atoms where hydrogen atom is not bonded to carbon atom adjacent to a double bond, $R^5$ represents an organic group having from 1 to 10 carbon atoms where hydrogen atom is not bonded to carbon atom adjacent to a double bond, $X^2$ represents a hydrogen atom, —$COOR^6$ wherein $R^6$ represents an alkyl group having from 1 to 10 carbon atoms or an alkoxyalkyl group having from 2 to 14 carbon atoms, or a group represented by following formula (3),

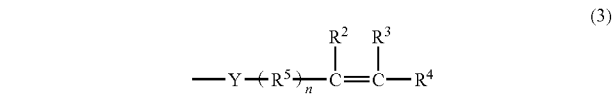
(3)

wherein Y represents

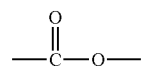

or —O—, and n is 1 or 0.

7. The oil-resistant and weather-resistant rubber composition according to claim 6, wherein a monomer forming the structural unit (A) is at least one selected from the group consisting of ethyl acrylate, n-butyl acrylate and methoxyethyl acrylate.

8. The oil-resistant and weather-resistant rubber composition according to claim 6, wherein the acrylic ester-based copolymer rubber further comprises (D) a structural unit derived from an unsaturated monomer having an epoxy group in an amount from 0.1 to 20 parts by mass when the total of the structural units (A), (B) and (C) is defined as 100 parts by mass.

9. An oil-resistant and weather-resistant rubber product which is obtained by crosslinking the oil-resistant and weather-resistant rubber composition according to claim 6, characterized in that the acrylic ester-based copolymer rubber (X) and the α,β-unsaturated nitrile-conjugated diene copolymer (Y) are co-crosslinked.

10. The oil-resistant and weather-resistant rubber product according to Claim 9, wherein the co-crosslinking is conducted with a tetraalkylthiuram disulfide having an alkyl group having from 2 to 18 carbon atoms.

MODE FOR CARRYING OUT THE INVENTION

The acrylic ester-based copolymer rubber of the present invention is characterized by comprising:

(A) a structural unit derived from at least one monomer selected from the group consisting of an acrylic acid alkyl ester and an acrylic acid alkoxyalkyl ester in an amount from 40 to 91.9% by mass, (B) a structural unit derived from an unsaturated nitrile monomer in an amount from 8 to 40% by mass, and (C) a structural unit derived from at least one monomer selected from the group consisting of a non-conjugated cyclic polyene and compounds represented by the following general formulas (1) and (2) in an amount from 0.1 to 20% by mass (provided (A)+(B)+(C)=100% by mass), wherein the Mooney viscosity [$ML_{1+4}(100°\,C.)$] is in the range from 10 to 200,

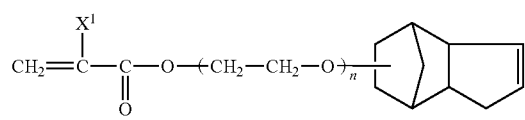

(1)

wherein $X^1$ represents a hydrogen atom or a methyl group, and n is an integer from 0 to 10,

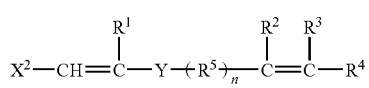

(2)

wherein $R^1$ represents a hydrogen atom or a methyl group, $R^2$, $R^3$ and $R^4$ each represent a hydrogen atom or an organic group having from 1 to 10 carbon atoms where hydrogen atom is not bonded to carbon atom adjacent to a double bond, $R^5$ represents an organic group having from 1 to 10 carbon atoms where hydrogen atom is not bonded to carbon atom adjacent to a double bond, $X^2$ represents a hydrogen atom, —$COOR^6$ wherein $R^6$ represents an alkyl group having from 1 to 10 carbon atoms or an alkoxyalkyl group having from 2 to 14 carbon atoms, or a group represented by following formula (3),

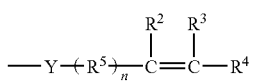

(3)

wherein Y represents

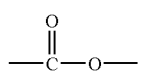

or —O—, and n is 1 or 0.

The respective constituents are described more specifically below.

Examples of the acrylic acid alkyl ester indicating as monomer (a) include methyl acrylate, ethyl acrylate, n-propyl acrylate, isopropyl acrylate, n-butyl acrylate, isobutyl acrylate, pentyl acrylate, hexyl acrylate, heptyl acrylate, 2-ethyl-hexyl acrylate, octyl acrylate, nonyl acrylate, decyl acrylate and the like. These may be used alone or in combination of two or more. Among these, ethyl acrylate and n-butyl acrylate are especially preferable in view of oil resistance and flexibility of a rubber product.

Examples of an acrylic acid alkoxyalkyl ester as monomer (a) include methoxymethyl acrylate, methoxyethyl acrylate, methoxypropyl acrylate, ethoxymethyl acrylate, ethoxyethyl acrylate, ethoxypropyl acrylate, butoxyethyl acrylate and the like. These may be used alone or in combination of two or more. Among these, methoxyethyl acrylate is especially preferable in view of cold resistance.

A content of the structural unit (A) [i.e., copolymerization amount of the monomer (a)] constituting the acrylic ester-based copolymer rubber of the present invention is in the range from 40 to 91.9% by mass, preferably from 55 to 89% by mass when the total content of all structural units is defined as 100% by mass. When the content is less than 40% by mass, the hardness of the resulting rubber product is too high, so that no appropriate elastic state tends to be provided. Meanwhile, when the content exceeds 91.9% by mass, the resulting rubber product tends to be inferior in oil resistance.

Examples of the unsaturated nitrile monomer (b) include acrylonitrile, methacrylonitrile, ethacrylonitrile, α-chloroacrylonitrile, α-fluoroacrylonitrile and the like. These may be used alone or in combination of two or more. Among these, acrylonitrile is especially preferable in view of fuel oil resistance.

A content of the structural unit (B) [i.e., copolymerization amount of the monomer (b)] constituting the acrylic ester-based copolymer rubber of the present invention is in the range from 8 to 40% by mass, preferably from 10 to 35% by mass. When the content is less than 8% by mass, the fuel oil resistance of the resulting rubber product is not enough. Meanwhile, when the content exceeds 40% by mass, the hardness of the resulting rubber product tends to be higher.

For the purpose of introducing crosslinking points, a monomer forming the structural unit (C) after copolymerization is a non-conjugated cyclic polyene and compounds represented by general formulas (1) and (2). These may be used alone or in combination of two or more.

Examples of the non-conjugated cyclic polyene include 5-ethylidene-2-norbornene, dicyclopentadiene, 5-propylidene-2-norbornene, 5-vinyl-2-norbornene, 2,5-norbornadiene, 1,4-cyclohexadiene, 1,4-cyclooctadiene, 1,5-cyclooctadiene, 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl), 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene and the like. These may be used alone or in combination of two or more. Among these, 5-ethylidene-2-norbornene is especially preferable.

The compound represented by the general formula (1) is an unsaturated carboxylic acid ester having a dihydrodicyclopentadienyloxyethyl group.

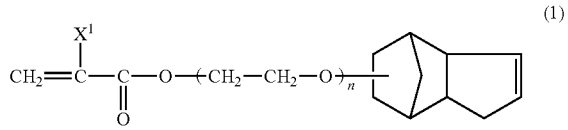

(1)

In the general formula (1), $X^1$ represents a hydrogen atom or a methyl group, and n is an integer from 0 to 10, preferably 1 or 2.

The unsaturated carboxylic acid ester having a dihydrodicyclopentadienyloxyethyl group as represented by the general formula (1) is synthesized, for example, by an esterification reaction of dihydrodicyclopentadienyloxyethylene or the like with an unsaturated carboxylic acid such as acrylic acid and methacrylic acid. Examples the ester include dihydrodicyclopentadienyl acrylate, dihydrodicyclopentadienyl methacrylate, dihydrodicyclopentadienyloxyethyl acrylate, dihydrodicyclopentadienyloxyethyl methacrylate, dihydrodicyclopentadienyloxyoxydiethyl acrylate, dihydrodicyclopentadienyloxydiethyl methacrylate and the like. These may be used alone or in combination of two or more. Among these, dihydrodicyclopentadienyloxyethyl acrylate is especially preferable in view of processability and strength characteristics.

Examples of the compound represented by the general formula (2) include vinyl acrylate, vinyl methacrylate, 1,1-dimethylpropenyl acrylate, 1,1-dimethylpropenyl methacrylate, 3,3-dimethylbutenyl acrylate, 3,3-dimethylbutenyl methacrylate, divinyl itaconate, divinyl maleate, divinyl fumarate, vinyl-1,1-dimethylpropenyl ether, vinyl-3,3-dimethylbutenyl ether, 1-acryloyloxy-1-phenylethene, 1-acryloyloxy-2-phenylethene, 1-methacryloyloxy-1-phenylethene, 1-methacryloyloxy-2-phenylethene and the like. These may be used alone or in combination of two or more. Among these, vinyl acrylate and vinyl methacrylate are especially preferable.

A content of the structural unit (C) constituting the acrylic ester-based copolymer rubber of the present invention is in the range from 0.1 to 20% by mass, preferably from 1 to 10% by mass when the total amount of all structural units is defined as 100% by mass. When the content is less than 0.1% by mass or exceeds 20% by mass, the resulting crosslinked product of the copolymer rubber tends to be inferior in tensile strength and tensile breaking elongation, and the hardness also tends to be worsened.

The proportions of the above structural units (A), (B) and (C) are, i.e., (A)/(B)/(C)=40 to 91.9% by mass/8 to 40% by mass/0.1 to 20% by mass, and preferably 55 to 89.7% by mass/10 to 35% by mass/0.3 to 10% by mass when the total amount of all structural units is defined as 100% by mass.

It is preferable that the acrylic ester-based copolymer rubber of the present invention further comprises (D) a structural unit derived from an unsaturated monomer having an epoxy group. Examples of the unsaturated monomer having an epoxy group include glycidyl acrylate, glycidyl methacrylate, vinyl glycidyl ether, allyl glycidyl ether, methacrylglycidyl ether and the like. These may be used alone or in combination of two or more. Among these, glycidyl methacrylate is especially preferable.

A content of the structural unit (D) is preferably in the range from 0.1 to 20 parts by mass, more preferably from 0.5 to 10 parts by mass and further preferably from 1 to 5 parts by mass, when the total amount of all structural units is defined as 100 parts by mass. This range can improve an ozone resistance of the resulting rubber product.

The acrylic ester-based copolymer rubber of the present invention can comprise, as required, a structural unit derived from an aromatic compound such as styrene, vinyl toluene, α-methylstyrene, vinylnaphthalene and halogenated styrene; an amide compound such as acrylamide, N-methylolacrylamide, N-(4-anilinophenyl)acrylamide and N-(4-anilinophenyl)methacrylamide; vinyl acetate; vinyl chloride; vinylidene chloride; an acrylic acid ester of an alicyclic alcohol such as cyclohexyl acrylate; acrylic acid ester of an aromatic alcohol such as benzyl acrylate; and an ester of an unsaturated carboxylic acid such as methacrylic acid, itaconic acid, fumaric acid and maleic acid and a lower saturated alcohol, unless the properties of the acrylic ester-based copolymer rubber of the present invention are impaired.

Further, the present acrylic ester-based copolymer rubber can comprise a structural unit derived from an amino group-containing ester of an unsaturated carboxylic acid such as dimethylaminoethyl (meth)acrylate and diethylaminoethyl (meth)acrylate.

The Mooney viscosity [$ML_{1+4}(100°\ C.)$] of the acrylic ester-based copolymer rubber of the present invention is in the range from 10 to 200, preferably from 20 to 100.

The weight average molecular weight of the acrylic ester-based copolymer rubber of the present invention measured by GPC (gel permeation chromatography) in terms of polystyrene is preferably 10,000 or more, especially preferably from 100,000 to 80,000,000. Within this range, the processability of the rubber composition is satisfactory, and the resulting rubber product is excellent in strength.

The acrylic ester-based copolymer rubber of the present invention can be crosslinked by a known method similarly to acrylic rubbers generally known.

The process for producing an acrylic ester-based copolymer rubber of the present invention is to copolymerize monomers comprising the above monomer (a) in an amount from 40 to 91.9% by mass, the above monomer (b) in an amount from 8 to 40% by mass and the monomer (c) selected from the group consisting of a non-conjugated cyclic polyene and the compounds represented by general formulas (1) and (2) in an amount from 0.1 to 20% by mass (provided (a)+(b)+(c) =100% by mass) in the presence of a radical polymerization initiator. The process for producing an acrylic ester-based copolymer rubber of the present invention is subjected to copolymerize the unsaturated monomer having an epoxy group and the like as required.

Specifically, the copolymer rubber is synthesized by copolymerizing a mixture containing the above monomers in the presence of a radical polymerization initiator such as an inorganic peroxide, an organic peroxide, an azo compound and a redox-based initiator. An amount of the radical polymerization initiator to be used is usually in the range from 0.001 to 2 parts by mass when the total amount of the monomers is defined as 100 parts by mass. As a polymerization method, a known method such as bulk polymerization, solution polymerization, suspension polymerization and emulsion polymerization is available. Emulsion polymerization is especially preferable.

Examples of an emulsifying agent used in emulsion polymerization include an anionic surfactant, a nonionic surfactant, a cationic surfactant and an ampholytic surfactant. In addition, a fluorine-based surfactant is also available. These emulsifying agents may be used alone or in combination of two or more. Usually, an anionic surfactant is often used. For example, long-chain fatty acid salts having 10 or more carbon atoms and rosic acid salts are used. Specific examples thereof include a potassium salt and a sodium salt of capric acid, lauric acid, myristic acid, palmitic acid, oleic acid and stearic acid.

As the radical polymerization initiator, an organic peroxide such as benzoyl peroxide, lauroyl peroxide, tert-butyl hydroperoxide, cumene hydroperoxide, p-menthane hydroperoxide, di-tert-butyl peroxide and dicumyl peroxide can be available. In addition, an azo compound such as azobisisobutyronitrile, an inorganic peroxide such as potassium persulfate, a redox-based catalyst such as a combination of any of these peroxides with ferrous sulfate, and the like can be also available. These radical polymerization initiators may be used alone or in combination of two or more.

A chain transfer agent may be used for adjusting the molecular weight of the copolymer rubber. As this chain transfer agent, an alkyl mercaptan such as tert-dodecyl mercaptan and n-dodecyl mercaptan, carbon tetrachloride, thioglycol, diterpene, terpinolene, γ-terpinene and the like can be available.

The acrylic ester-based copolymer rubber of the present invention may be produced by charging the respective monomers, an emulsifying agent, a radical polymerization initiator, a chain transfer agent and the like in a reactor completely at a time to start the polymerization, or by adding the same continuously or intermittently during the reaction. This polymerization can be performed in the range from 0 to 100° C. using an oxygen-free reactor. It is preferably performed at a polymerization temperature in the range from 0 to 80° C. During the reaction, production conditions such as a temperature, stirring and the like can be changed as required. The polymerization may be conducted either continuously or batchwise.

The polymerization time is usually from 0.01 to 30 hours. The desired copolymer rubber is obtained by, after completion of the polymerization, charging the emulsion into an aqueous solution of an inorganic salt such as sodium chloride or calcium chloride to coagulate a copolymer rubber, washing the resulting rubber with water and drying it.

The Mooney viscosity [$ML_{1+4}$(100° C.)] of the above-obtained copolymer rubber is preferably in the range from 10 to 200, more preferably from 20 to 100.

The rubber composition of the present invention is characterized by comprising the above acrylic ester-based copolymer rubber and sulfur and/or an organic peroxide. Usually, the rubber composition may further contain a plasticizer, a filler, a reinforcing agent such as carbon black, a metal oxide, a softening agent, an antioxidant, a processing aid, a flame retardant, an ultraviolet absorber and the like in appropriate amounts.

Sulfur and/or the organic peroxide is used as a crosslinking agent.

Examples of sulfur include powdered sulfur, precipitated sulfur, colloidal sulfur, surface-treated sulfur, insoluble sulfur and the like.

A sulfur compound that releases active sulfur at a crosslinking temperature to crosslink, such as morpholine disulfide, an alkylphenol disulfide having from 1 to 18 carbon atoms, a tetraalkylthiuram disulfide having from 1 to 18 carbon atoms, dipentamethylenethiuram tetrasulfide and selenium dimethyldithiocarbamate may be used as a vulcanization accelerator. Among these, a tetraalkylthiuram disulfide having from 2 to 18 carbon atoms is preferable.

Examples of the organic peroxide include dicumyl peroxide, di-t-butyl peroxide, di-t-butylperoxy-3,3,5-trimethylcyclohexane, t-butyl hydroperoxide, t-butylcumyl peroxide, benzoyl peroxide, 2,5-dimethyl-2,5-di(t-butylperoxine)hexyne-3,2,5-dimethyl-2,5-di(benzoylperoxy)hexane, 2,5-dimethyl-2,5-mono(t-butylperoxy)-hexane, α,α'-bis(t-butylperoxy-m-isopropyl)benzene and the like. Among these, dicumyl peroxide, di-t-butyl peroxide and di-t-butylperoxy-3,3,5-trimethylcyclohexane are preferable. These organic peroxides may be used alone or in combination of two or more.

As the crosslinking agent, sulfur and the organic peroxide may be used in combination. The amount of the crosslinking agent to be used is usually in the range from 0.1 to 10 parts by mass, especially preferably from 1 to 6 parts by mass when the total amount of rubber components is defined as 100 parts by mass.

In addition, when the crosslinking agent is used, a crosslinking accelerator, a crosslinking aid and the like may be used. Examples of the crosslinking accelerator include a sulfonamide-based compound such as N-cyclohexyl-2-benzothiazolyl sulfenamide, N-oxydiethylene-2-benzothiazolyl sulfenamide and N,N-diisopropyl-2-benzothiazolyl sulfenamide; a thiazole compound such as 2-mercaptobenzothiazole, 2-(2',4'-dinitrophenyl)mercaptobenzothiazole, 2-(4'-morpholinodithio)benzothiazole and dibenzothiazyl disulfide; a guanidine compound such as diphenylguanidine, diorthotolylguanidine, diorthonitrileguanidine, orthonitrile biguanide and diphenylguanidine phthalate; an aldehydeamine-based compound or an aldehyde-ammonia compound such as an acetaldehyde-aniline reaction product, a butylaldehyde-aniline condensate, hexamethylenetetramine and acetaldehyde ammonia; an imidazoline compound such as 2-mercaptoimidazoline; a thiourea compound such as thiocarbanilide, diethylthiourea, dibutylthiourea, trimethylthiourea and diorthotolylthiourea; a thiuram-based compound such as tetramethylthiuram monosulfide, tetramethylthiuram disulfide, tetraethylthiuram disulfide, tetrabutylthiuram disulfide, tetraoctylthiuram disulfide and pentamethylenethiuram tetrasulfide; a dithio acid salt-based compound such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; a xanthate-based compound such as zinc dibutylxanthogenate; and a compound such as zinc oxide.

Examples of the crosslinking aid include a quinone dioxime-based compound such as p-quinone dioxime; a methacrylate-based compound such as polyethylene glycol dimethacrylate; an allyl-based compound such as diallyl phthalate and triallyl cyanurate; a maleimide-based compound; divinyl benzene; and the like.

Examples of the plasticizer include a phthalate such as dimethyl phthalate, diethyl phthalate, dibutyl phthalate, diisobutyl phthalate, dioctyl phthalate, butyloctyl phthalate, di-(2-ethylhexyl)phthalate, diisooctyl phthalate and diisodecyl phthalate; an aliphatic acid ester such as dimethyl adipate, diisobutyl adipate, di-(2-ethylhexyl)adipate, diisooctyl adipate, diisodecyl adipate, octyldecyl adipate, di-(2-ethylhexyl) azelate, diisooctyl azelate, diisobutyl azelate, dibutyl sebacate, di-(2-ethylhexyl)sebacate and diisooctyl sebacate; a trimellitic acid ester such as isodecyl trimellitate, octyl trimellitate, n-octyl trimellitate and isononyl trimellitate; di-(2-ethylhexyl)fumarate, diethylene glycol monoolate, glyceryl monoricinoleate, trilauryl phosphate, tristearyl phosphate, tri-(2-ethylhexyl)phosphate, epoxidized soybean oil, polyether esters and the like. These may be used alone or in combination of two or more.

Examples of the filler include silica, ground calcium carbonate, chalk, light calcium carbonate, microfine activated calcium carbonate, special calcium carbonate, basic magnesium carbonate, kaolin clay, calcined clay, pyrophyllite clay, silane-treated clay, synthetic calcium silicate, synthetic magnesium silicate, synthetic aluminum silicate, magnesium carbonate, aluminum hydroxide, magnesium hydroxide, magnesium oxide, kaolin, sericite, talc, pulverized talc, wollastonite, zeolite, xonotlite, asbestos, PMF (Processed Mineral Fiber), sepiolite, potassium titanate, ellestadite, gypsum fiber, glass balloon, silica balloon, hydrotalcite, fry ash balloon, shirasu balloon, carbon balloon, alumina, barium sulfate, aluminum sulfate, calcium sulfate, molybdenum disulfide and the like. These may be used alone or in combination of two or more.

Examples of carbon black as an example of the reinforcing agent include SAF carbon black, ISAF carbon black, HAF carbon black, FEF carbon black, GPF carbon black, SRF carbon black, FT carbon black, MT carbon black, acetylene carbon black, Ketjen carbon black and the like. These may be used alone or in combination of two or more.

Examples of the metal oxide include zinc oxide, active zinc oxide, surface-treated zinc oxide, zinc carbonate, composite zinc oxide, composite active zinc oxide, surface-treated magnesium oxide, magnesium oxide, calcium hydroxide, microfine calcium hydroxide, lead monoxide, red lead oxide, white lead and the like. These may be used alone or in combination of two or more.

Examples of the softening agent include a petroleum softening agent, a vegetable oil softening agent, a factice and the like. These may be used alone or in combination of two or more.

Examples of the petroleum softening agent include aromatic-based, naphthenic-based and paraffinic-based softening agents. Examples of the vegetable softening agent include castor oil, cottonseed oil, linseed oil, rapeseed oil, soybean oil, palm oil, coconut oil, peanut oil, Japan wax and the like. Examples of the factice include a brown factice, a white factice, a semitranslucent factice and the like.

Examples of the antioxidant include naphthylamine-based, diphenylamine-based, p-phenylenediamine-based, quinoline-based, hydroquinone derivative-based, monophenol-based, bisphenol-based, trisphenol-based, polyphenol-based, thiobisphenol-based, hindered phenol-based, phosphorous ester-based, imidazole-based, nickel dithiocarbamate-based, phosphoric acid-based antioxidants and the like. These may be used alone or in combination of two or more.

Examples of the processing aid include stearic acid, oleic acid, lauric acid, zinc stearate, calcium stearate, potassium stearate, sodium stearate, stearylamine and the like. These may be used alone or in combination of two or more.

The rubber composition of the present invention may contain other rubber as a rubber component. Other rubber is not particularly limited. An acrylic ester-based copolymer rubber other than that of the invention, a styrene-butadiene copolymer rubber, a butadiene rubber, an isoprene rubber, a butadiene-isoprene copolymer rubber, a butadiene-styrene-isoprene copolymer rubber, an acrylonitrile-butadiene copolymer rubber, a butyl rubber, a natural rubber, a chloroprene rubber and the like are available. In addition, an olefinic resin such as polyethylene and polypropylene may be used in combination.

Crosslinking of the rubber composition of the present invention with sulfur and/or the organic peroxide leads to a crosslinked rubber composition which has oil resistance and thermal resistance and which is excellent in fuel oil resistance and tensile strength.

The oil-resistant and weather-resistant rubber composition of the present invention is characterized by comprising the above acrylic ester-based copolymer rubber (hereinafter also referred to as "component (X)") in an amount from 10 to 50% by mass and an unsaturated nitrile-conjugated diene copolymer (hereinafter also referred to as "component (Y)") in an amount from 90 to 50% by mass (provided (X)+(Y)=100% by mass).

The component (Y) is not particularly limited so long as it is a polymer comprising a structural unit derived from an unsaturated nitrile monomer and a structural unit derived from a conjugated diene monomer.

Examples of the unsaturated nitrile monomer include acrylonitrile, methacrylonitrile and the like. Among these, acrylonitrile is preferable. These may be used alone or in combination of two or more.

Examples of the conjugated diene monomer include 1,3-butadiene, isoprene (2-methyl-1,3-butadiene), 2,3-dimethyl-1,3-butadiene, chloroprene (2-chloro-1,3-butadiene) and the like. These may be used alone or in combination of two or more.

The proportions of the above structural unit (P) derived from the unsaturated nitrile monomer and the above structural unit (O) derived from the conjugated diene monomer are, i.e., (P)/(O)=30 to 70% by mass/70 to 30% by mass preferably, and it is more preferably 40 to 60% by mass/60 to 40% by mass when the total amount of all structural units is defined as 100% by mass. When the content of the structural unit (P) is less than 30% by mass, the oil resistance and the like tend to be decreased. Meanwhile, when the content exceeds 70% by mass, the productivity might be decreased, and the resulting rubber product might be hardened.

The component (Y) may be a product obtained by copolymerizing the other monomer with the unsaturated nitrile monomer and the conjugated diene monomer.

Examples of the other monomer include an aromatic vinyl-based monomer, an (meth)acrylic acid alkyl ester and the like. These may be used alone or in combination of two or more.

Examples of the aromatic vinyl-based monomer include styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrene and the like. These monomers may be used alone or in combination of two or more.

The aromatic vinyl-based monomer may be a compound having a functional group such as an amino group and a hydroxyl group.

Examples of the aromatic vinyl-based monomer having an amino group include a compound having a tertiary amino group such as N,N-dimethyl-p-aminostyrene, N,N-diethyl-p-aminostyrene, dimethyl(p-vinylbenzyl)amine, diethyl(p-vinylbenzyl)amine, dimethyl(p-vinylphenetyl)amine, diethyl (p-vinylphenetyl)amine, dimethyl(p-vinylbenzyloxymethyl) amine, dimethyl[2-(p-vinylbenzyloxy)ethyl]amine, diethyl (p-vinylbenzyloxymethyl)amine, diethyl[2-(p-vinylbenzyloxy)ethyl]amine, dimethyl(p-vinylphenetyloxymethyl)amine, dimethyl[2-(p-vinylphenetyloxy)ethyl]amine, diethyl(p-vinylphenetyloxymethyl)amine, diethyl[2-(p-vinylphenetyloxy)ethyl]amine, 2-vinylpyridine, 3-vinylpyridine, 4-vinylpyridine and the like. These monomers may be used alone or in combination of two or more.

Examples of the aromatic vinyl-based monomer having a hydroxyl group include o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like. These monomers may be used alone or in combination of two or more.

Examples of the (meth)acrylic acid alkyl ester include methyl(meth)acrylate, ethyl(meth)acrylate, n-propyl(meth)

acrylate, isopropyl(meth)acrylate, n-butyl(meth)acrylate, n-amyl(meth)acrylate, n-hexyl(meth)acrylate, 2-ethylhexyl (meth)acrylate, cyclohexyl(meth)acrylate and the like. These monomers may be used alone or in combination of two or more.

The (meth)acrylic acid alkyl ester may be a compound having a functional group such as an amino group, a hydroxyl group, an epoxy group and a carboxyl group.

Examples of the (meth)acrylic acid alkyl ester having an amino group include dimethylaminomethyl(meth)acrylate, diethylaminomethyl(meth)acrylate, 2-dimethylaminoethyl (meth)acrylate, 2-diethylaminoethyl(meth)acrylate, 2-(di-n-propylamino)ethyl(meth)acrylate, 2-dimethylaminopropyl (meth)acrylate, 2-diethylaminopropyl(meth)acrylate, 2-(di-n-propylamino)propyl(meth)acrylate, 3-dimethylaminopropyl(meth)acrylate, 3-diethylaminopropyl(meth)acrylate, 3-(di-n-propylamino)propyl(meth)acrylate and the like. These monomers may be used alone or in combination of two or more.

Examples of the (meth)acrylic acid alkyl ester having a hydroxyl group include a hydroxyalkyl(meth)acrylate such as 2-hydroxyethyl(meth)acrylate, 2-hydroxypropyl(meth) acrylate, 3-hydroxypropyl(meth)acrylate, 2-hydroxybutyl (meth)acrylate, 3-hydroxybutyl(meth)acrylate and 4-hydroxybutyl(meth)acrylate; a mono(meth)acrylate of a polyalkylene glycol (the number of alkylene glycol units is, for example, from 2 to 23) such as polyethylene glycol and polypropylene glycol, and the like. These monomers may be used alone or in combination of two or more.

Examples of the (meth)acrylic acid alkyl ester having an epoxy group include glycidyl(meth)acrylate, 3,4-oxycyclohexyl(meth)acrylate, and the like. These monomers may be used alone or in combination of two or more.

Examples of the (meth)acrylic acid alkyl ester having a carboxyl group include a monoester of a non-polymerizable polybasic carboxylic acid such as phthalic acid, succinic acid and adipic acid and an unsaturated compound having a hydroxyl group such as 2-hydroxyethyl(meth)acrylate, salts thereof, and the like. These monomers may be used alone or in combination of two or more.

The other monomer can be copolymerized unless the characteristics of the resulting unsaturated nitrile-conjugated diene copolymer are impaired. The amount in the case of using the other monomer is preferably 20 parts by mass or less, especially preferably 10 parts by mass or less when the total amount of the unsaturated nitrile monomer and the conjugated diene monomer is defined as 100 parts by mass.

The Mooney viscosity [$ML_{1+4}(100°C.)$] of the component (Y) is preferably in the range from 30 to 150, more preferably from 50 to 100. When the Mooney viscosity is less than 30, the tensile strength tends to be decreased. Meanwhile, when it exceeds 150, the processability tends to be decreased.

The contents (X)/(Y) of the component (X) and the component (Y) constituting the oil-resistant and weather-resistant rubber composition of the present invention are 10 to 50% by mass/90 to 50% by mass, preferably 20 to 40% by mass/80 to 60% by mass when the total amount thereof is defined as 100% by mass. When the content of the component (X) is too much, the tensile strength tends to be decreased.

The oil-resistant and weather-resistant rubber composition of the present invention may contain the various additives listed above.

The rubber product using the rubber composition and the oil-resistant and weather-resistant rubber composition of the present invention can be produced, for example, in the following manner.

First, the acrylic ester-based copolymer rubber of the present invention, a filler, a reinforcing agent such as carbon black, a softening agent and the other additives except the crosslinking agent are kneaded at a temperature in the range from 70 to 180° C. using a kneading machine such as Banbury mixer. Subsequently, the kneaded product is cooled, further mixed with a crosslinking agent such as sulfur, a crosslinking accelerator and the like using a Banbury mixer, a mixing roll or the like, and molded into a predetermined shape. The resulting product is then crosslinked at a temperature in the range from 130 to 200 C. to provide a desired crosslinked rubber composition, namely a rubber product.

The oil-resistant and weather-resistant rubber product of the present invention is produced by crosslinking the oil-resistant and weather-resistant rubber composition, and it is characterized in that the above components (X) and (Y) are co-crosslinked.

A composition which is used to obtain the oil-resistant and weather-resistant rubber product contains additives such as a crosslinking agent selected from sulfur and/or the organic peroxide, and the like. Since this composition contains the above components (X) and (Y) having an unsaturated bond, the co-crosslinking can be conducted by the "crosslinking" step via the unsaturated bond.

In the co-crosslinking, sulfur is preferably used as the crosslinking agent, and it is more preferable to use a tetraalkylthiuram disulfide having from 2 to 18 carbon atoms in combination.

A process for producing the oil-resistant and weather-resistant rubber product is not particularly limited, and it is the same as described on the production of the rubber product.

The oil-resistant and weather-resistant rubber product of the present invention has oil resistance and thermal resistance and is excellent in fuel oil resistance and tensile strength. Upon making use of these effects, it can advantageously be used in various a hose member such as an oil cooler hose, an air duct hose, a power steering hose, a control hose, an intercooler hose, a tor-con hose, an oil return hose and a heat-resistant hose, a fuel hose member, a seal member such as a bearing seal, a valve stem seal, various oil seals, an O-ring, a packing and a gasket, various diaphragms, a rubber plate, a belt, an oil level gauge, a coating member such as a hose masking and a piping insulation member, a roll and the like.

BEST MODE FOR CARRYING OUT THE INVENTION

The invention is illustrated more specifically below by referring to Examples. However, the invention is not limited at all by these Examples.

In Examples and Comparative Examples, part(s) and % are on the mass basis unless otherwise instructed.

1. Production of an Acrylic Ester-Based Copolymer Rubber

EXAMPLE 1

A monomer mixture comprising 83 parts of ethyl acrylate, 12 parts of acrylonitrile and 5 parts of dihydrodicyclopentadienyloxyethyl acrylate (DCPOEA); 4 parts of sodium lauryl sulfate, 200 parts of water and 0.2 part of potassium persulfate were charged into a nitrogen-purged stainless steel reactor to conduct polymerization at 50%. When a polymerization conversion rate reached nearly 100%, 0.5 part of N,N-diethylhydroxylamine was added to the reaction system to stop the copolymerization reaction (reaction time 15 hours). Subsequently, the reaction product (latex) was withdrawn, and a calcium chloride aqueous solution (0.25%) was added to the reaction product to coagulate a copolymer rubber. This coagulated product was thoroughly washed with water, and then dried at approximately 90 for 3 hours to obtain the copolymer rubber R-1 whose Mooney viscosity [$ML_{1+4}$(100° C.)] is 72 (refer to Table 1).

EXAMPLES 2 TO 9 AND COMPARATIVE EXAMPLES 1 TO 3

Copolymer rubbers R-2 to R-12 were obtained as in Example 1 except that polymerization was conducted using predetermined amounts of monomers shown in Table 1.

All of the copolymer rubbers were measured with a scanning differential calorimeter (DSC). Single glass transition points different from those of homopolymers of the monomers constituting the copolymer rubbers were observed, and the resulting copolymer rubbers were confirmed to be random copolymers.

by ASAHI DENKA CO., LTD.), 2.0 parts of sulfur (manufactured by TSURUMI CHEMICAL CO., LTD.), 2.0 parts of tetraoctylthiuram disulfide (Trade name: "NOCCELER TOT-N", manufactured by OUCHISHINKO CHEMICAL INDUSTRIAL CO., LTD.) as a vulcanization accelerator (I), 1.0 part of N-cyclohexyl-2-benzothiazolylsulfenamide (Trade name: "NOCCELER CZ", manufactured by OUCHISHINKO CHEMICAL INDUSTRIAL CO., LTD.) as a vulcanization accelerator (II) and 0.5 part of 2-mercaptobenzothiazole (Trade name: "NOCCELER M", manufactured by OUCHISHINKO CHEMICAL INDUSTRIAL CO., LTD.) as a vulcanization accelerator (III.) were kneaded by a roll to prepare a composition. Press vulcanization was conducted at 170° C. for 20 minutes to produce a vulcanized rubber sheet, and properties thereof were evaluated. The results are shown in Tables 2 and 3.

The evaluation of the vulcanized rubber compositions was performed by the following methods.

TABLE 1

| | | | Example | | | | | | | | | Comparative Example | | |
|---|---|---|---|---|---|---|---|---|---|---|---|---|---|---|
| | | | 1 | 2 | 3 | 4 | 5 | 6 | 7 | 8 | 9 | 1 | 2 | 3 |
| Acrylic ester-based copolymer rubber | | | R-1 | R-2 | R-3 | R-4 | R-5 | R-6 | R-7 | R-8 | R-9 | R-10 | R-11 | R-12 |
| Structural unit (% by mass) | (A) | Ethyl acrylate | 83 | 70 | | 67 | 70 | 82 | 69 | 74.7 | 39 | 95 | 90 | 45 |
| | | Butyl acrylate | | | 25 | | | | | | | | | |
| | | Methoxyethyl acrylate | | | 40 | 10 | | | | | | | | |
| | (B) | Acrylonitrile | 12 | 25 | 30 | 20 | 25 | 12 | 25 | 25 | 25 | | 5 | 50 |
| | (C) | DCPOEA | 5 | 5 | 5 | 3 | | 3 | 3 | | 3 | 5 | 5 | 5 |
| | | 5-Ethylidene-2-norbornene | | | | | 5 | | | | | | | |
| | | Vinyl acrylate | | | | | | | | 0.3 | | | | |
| | (D) | Glycidyl methacrylate | | | | | | 3 | 3 | | 3 | | | |
| | | Methyl methacrylate | | | | | | | | | 30 | | | |
| Mooney viscosity [$ML_{1+4}$(100° C.)] | | | 72 | 60 | 65 | 63 | 60 | 73 | 65 | 60 | 58 | 65 | 70 | 80 |

2. Preparation of Composition Containing a Copolymer Rubber and Evaluation Thereof

EXAMPLES 10 TO 18 AND COMPARATIVE EXAMPLES 4 TO 6

100 parts of each of copolymer rubbers R-1 to R-12 obtained above, 1.0 part of stearic acid (manufactured by KAO CORPORATION), 50 parts of carbon black (Trade name: "Seast 116", manufactured by TOKAI CARBON CO., LTD.), 5.0 parts of zinc oxide, 15 parts of an adipic acid ether ester-based plasticizer (Trade name: "RS107", manufactured (a) Tensile breaking strength $T_B$ and tensile breaking elongation $E_B$: Measured according to JIS K 6251.

(b) Hardness $H_A$: Measured according to JIS K 6253 (Type A durometer hardness test).

(c) Compression Set $C_S$: According to JIS K 6262, heat treatment was conducted at 100% for 22 hours, and a value after 25% compression was measured.

(d) Fuel oil resistance: According to JIS K 6258, a volume change (ΔV) was obtained by a dipping test at 40° C. for 48 hours using Fuel C test oil and ethanol-containing Fuel C test oil.

TABLE 2

| | | | Example | | | | | |
|---|---|---|---|---|---|---|---|---|
| | | | 10 | 11 | 12 | 13 | 14 | 15 |
| Formulation of composition (% by mass) | Acrylic ester-based copolymer rubber | R-1 | 100 | | | | | |
| | | R-2 | | 100 | | | | |
| | | R-3 | | | 100 | | | |
| | | R-4 | | | | 100 | | |
| | | R-5 | | | | | 100 | |
| | | R-6 | | | | | | 100 |
| | Additives | Stearic acid | 1.0 | 1.0 | 1.0 | 1.0 | 1.0 | 1.0 |
| | | Carbon black | 50 | 50 | 50 | 50 | 50 | 50 |
| | | Zinc oxide | 5.0 | 5.0 | 5.0 | 5.0 | 5.0 | 5.0 |
| | | Plasticizer | 15 | 15 | 15 | 15 | 15 | 15 |
| | | Sulfur | 2.0 | 2.0 | 2.0 | 2.0 | 2.0 | 2.0 |
| | | Vulcanization accelerator (I) | 2.0 | 2.0 | 2.0 | 2.0 | 2.0 | 2.0 |

TABLE 2-continued

|  |  |  | Example | | | | | |
|---|---|---|---|---|---|---|---|---|
|  |  |  | 10 | 11 | 12 | 13 | 14 | 15 |
|  |  | Vulcanization accelerator (II) | 1.0 | 1.0 | 1.0 | 1.0 | 1.0 | 1.0 |
|  |  | Vulcanization accelerator (III) | 0.5 | 0.5 | 0.5 | 0.5 | 0.5 | 0.5 |
| Physical properties | Mechanical properties | $T_B$ (MPa) | 13.5 | 16.6 | 15 | 15.8 | 15 | 14.6 |
|  |  | $E_B$ (%) | 380 | 370 | 400 | 380 | 400 | 410 |
|  |  | $H_A$ (Duro-A) | 76 | 82 | 82 | 80 | 81 | 77 |
|  | $C_S$(100° C. × 22 hrs) (%) | | 30 | 32 | 30 | 33 | 35 | 30 |
|  | Fuel oil resistance ΔV (Fuel C, 40° C. × 48 hrs) | | 27 | 19 | 16 | 23 | 23 | 22 |
|  | Fuel oil resistance ΔV (Fuel C/EtOH(80/20), 40° C. × 48 hrs) | | 94 | 38 | 30 | 64 | 43 | 82 |
|  | Low-temperature property (Tg of copolymer rubber) (° C.) | | 5 | 21 | 22 | 12 | 22 | 6 |

TABLE 3

|  |  |  | Example | | | Comparative Example | | |
|---|---|---|---|---|---|---|---|---|
|  |  |  | 16 | 17 | 18 | 4 | 5 | 6 |
| Formulation of composition (% by mass) | Acrylic ester-based copolymer rubber | R-7 | 100 |  |  |  |  |  |
|  |  | R-8 |  | 100 |  |  |  |  |
|  |  | R-9 |  |  | 100 |  |  |  |
|  |  | R-10 |  |  |  | 100 |  |  |
|  |  | R-11 |  |  |  |  | 100 |  |
|  |  | R-12 |  |  |  |  |  | 100 |
|  | Additives | Stearic acid | 1.0 | 1.0 | 1.0 | 1.0 | 1.0 | 1.0 |
|  |  | Carbon black | 50 | 50 | 50 | 50 | 50 | 50 |
|  |  | Zinc oxide | 5.0 | 5.0 | 5.0 | 5.0 | 5.0 | 5.0 |
|  |  | Plasticizer | 15 | 15 | 15 | 15 | 15 | 15 |
|  |  | Sulfur | 2.0 | 2.0 | 2.0 | 2.0 | 2.0 | 2.0 |
|  |  | Vulcanization accelerator (I) | 2.0 | 2.0 | 2.0 | 2.0 | 2.0 | 2.0 |
|  |  | Vulcanization accelerator (II) | 1.0 | 1.0 | 1.0 | 1.0 | 1.0 | 1.0 |
|  |  | Vulcanization accelerator (III) | 0.5 | 0.5 | 0.5 | 0.5 | 0.5 | 0.5 |
| Physical properties | Mechanical properties | $T_B$ (MPa) | 17.8 | 15.6 | 17.6 | 11.7 | 12 | 18 |
|  |  | $E_B$ (%) | 380 | 400 | 390 | 400 | 410 | 300 |
|  |  | $H_A$ (Duro-A) | 83 | 84 | 90 | 66 | 70 | 96 |
|  | $C_S$(100° C. × 22 hrs) (%) | | 33 | 29 | 28 | 30 | 29 | 36 |
|  | Fuel oil resistance ΔV (Fuel C, 40° C. × 48 hrs) | | 15 | 20 | 12 | 67 | 50 | 10 |
|  | Fuel oil resistance ΔV (Fuel C/EtOH(80/20), 40° C. × 48 hrs) | | 30 | 38 | 25 | 174 | 140 | 20 |
|  | Low-temperature property (Tg of copolymer rubber) (° C.) | | 23 | 21 | 28 | −15 | −7 | 60 |

According to the results in Table 2, it is found that Examples 10 to 18 using the compositions containing acrylic ester-based copolymer rubbers R-1 to R-5 are excellent in mechanical strength, compression set and fuel oil resistance, and especially excellent in alcohol-containing fuel oil resistance. Meanwhile, Comparative Example 4 using the composition containing acrylic ester-based copolymer rubber R-10 was inferior in fuel oil resistance and mechanical strength because it did not contain the structural unit derived from the unsaturated nitrile monomer. Comparative Example 5 using the composition containing acrylic ester-based copolymer rubber R-11 was inferior in fuel oil resistance and mechanical strength because the content of the structural unit derived from the unsaturated nitrile monomer was low. Comparative Example 6 using the composition containing acrylic ester-based copolymer rubber R-12 had an increased hardness because the content of the structural unit derived from the unsaturated nitrile monomer was too much and it is found to be inferior in flexibility.

3. Preparation of an Oil-Resistant and Weather-Resistant Rubber composition and Evaluation Thereof.

EXAMPLES 19 TO 24 AND COMPARATIVE EXAMPLES 7 TO 18

The following acrylic ester-based copolymer rubbers and the like were used, mixed at ratios shown in Tables 4 to 8, and kneaded by a Banbury mixer and a roll to prepare oil-resistant and weather-resistant rubber compositions. These compositions were preformed, and then press-vulcanized at 170° C. for 10 minutes to produce vulcanized rubber sheets.

The starting materials used are as follows.

"R-13"; acrylic ester-based copolymer rubber using 87% by mass of ethyl acrylate, 10% by mass of acrylonitrile and 3% by mass of 5-ethylidene-2-norbornene.

"R-14"; acrylic ester-based copolymer rubber using 72% by mass of ethyl acrylate, 25% by mass of acrylonitrile and 3% by mass of dicyclopentadienyloxyethyl acrylate.

"R-15"; acrylic ester-based copolymer rubber using 71% by mass of ethyl acrylate, 25% by mass of acrylonitrile, 1% by mass of ethylene glycol dimethacrylate and 3% by mass of 5-ethylidene-2-norbornene.

"R-16"; acrylic ester-based copolymer rubber using 84% by mass of ethyl acrylate, 10% by mass of acrylonitrile, 3% by mass of dicyclopentadienyloxyethyl acrylate and 3% by mass of allylglycidyl ether.

"R-17"; acrylic ester-based copolymer rubber using 69% by mass of ethyl acrylate, 25% by mass of acrylonitrile, 3% by mass of dicyclopentadienyloxyethyl acrylate and 3% by mass of allylglycidyl ether.

"R-18"; acrylic ester-based copolymer rubber using 97% by mass of ethyl acrylate and 3% by mass of dicyclopentadienyloxyethyl acrylate.

"R-19"; acrylic ester-based copolymer rubber using 95% by mass of ethyl acrylate, 3% by mass of dicyclopentadienyloxyethyl acrylate and 2% by mass of ethylene glycol dimethacrylate.

"N217SH"; NBR (Trade name: "N217SH", manufactured by JSR CORPORATION), acrylonitrile content is 47% by mass and Mooney viscosity $[ML_{1+4}(100°\ C.)]$ is approximately 70.

"NE61"; NBR/EPDM alloy (Trade name: "NE61", manufactured by JSR CORPORATION).

"N230S": NBR (Trade name: "N230S", manufactured by JSR CORPORATION), acrylonitrile content is 35% by mass and Mooney viscosity $[ML_{1+4}(100°\ C.)]$ is 56.

"NV72"; NBR (Trade name: "NV72", manufactured by JSR CORPORATION), medium high AN, Mooney viscosity $[ML_{1+4}(100°\ C.)]$ is 75.

"Super high AN-NV"; rubber component obtained by mixing the above "N217SH", NBR (Trade name: "N280", manufactured by JSR CORPORATION) and polyvinyl chloride (Trade name: "PVC3000H", manufactured by Taiyo Vinyl Corporation) at a weight ratio of 65:5:30.

"AREX117"; chlorinated acrylic ester-based copolymer rubber using 99% by mass of ethyl acrylate and 1% by mass of vinyl chloroacetate.

"TN80"; fluororubber (Trade name: "TECHNOFLON TN80", manufactured by Montedison S.p.A.)

"carbon black (I)"; MAF carbon (Trade name: "Seast 116", manufactured by TOKAI CARBON CO., LTD.).

"carbon black (II)"; FT carbon black (Trade name: "ASAHI THERMAL", manufactured by ASAHI CARBON CO., LTD.)

"plasticizer (I)"; adipic acid ether ester-based plasticizer (Trade name: "RS107", manufactured by ASAHIDENKA CO., LTD.)

"plasticizer (II)"; polyether ester plasticizer (Trade name: "RS735", manufactured by ASAHIDENKA CO., LTD.)

"stearic acid"; (manufactured by KAO CORPORATION)

"zinc oxide"; (Trade name: "ZnO #2", manufactured by SAKAI CHEMICAL INDUSTRY CO., LTD.)

"magnesium oxide"; (Trade name: "MgO #150", manufactured by KYOWA CHEMICAL INDUSTRY CO., LTD.)

"calcium hydroxide"; (Trade name: "Calvit", manufactured by OHMI CHEMICAL INDUSTRY CO., LTD.)

"softening agent"; naphthenic oil (Trade name: "Fukkol Flex 2050N", manufactured by FUJI KOSAN CO., LTD.)

"sulfur (I)"; (manufactured by TSURUMI CHEMICAL CO., LTD.)

"sulfur (II)"; sulfur (Trade name: "Sulfax", manufactured by TSURUMI CHEMICAL CO., LTD.)

"organic peroxide"; dicumyl peroxide (Trade name: "DCP40", manufactured by NOF CORPORATION)

"vulcanization accelerator (I)"; (Trade name: "NOCCELER TOT-N", manufactured by OUCHISHINKO CHEMICAL INDUSTRIAL CO., LTD.)

"vulcanization accelerator (II)"; (Trade name: "NOCCELER CZ", manufactured by OUCHISHINKO CHEMICAL INDUSTRIAL CO., LTD.)

"vulcanization accelerator (III)"; (Trade name: "NOCCELER M", manufactured by OUCHISHINKO CHEMICAL INDUSTRIAL CO., LTD.)

"vulcanization accelerator (IV)"; tetraethylthiuram disulfide (Trade name: "NOCCELER TET", manufactured by OUCHISHINKO CHEMICAL INDUSTRIAL CO., LTD.)

"vulcanization accelerator (V)"; tetramethylthiuram disulfide (Trade name: "NOCCELER TT", manufactured by OUCHISHINKO CHEMICAL INDUSTRIAL CO., LTD.)

"crosslinking agent (I)"; FKM crosslinking agent ("TECHNOFLON M1", manufactured by Montedison S.p.A.)

"crosslinking agent (II)"; FKM crosslinking agent ("TECHNOFLON M2", manufactured by Montedison S.p.A.)

"sodium stearate"; (manufactured by YCHEM CO., LTD.)

"potassium stearate"; (manufactured by NOF CORPORATION).

The rubber compositions and the vulcanized rubber compositions were evaluated by the following methods. The results are shown in Tables 4 to 8.

(a) Mooney viscosity: Measured at a temperature of 100% according to JIS K 6300.

(b) Mechanical properties: Tensile breaking strength $T_B$ and tensile breaking elongation $E_B$ were measured according to JIS K 6251, and hardness $H_A$ according to JIS K 6253.

(c) Thermal aging test: According to JIS K 6257, heat treatment was conducted at 100° C. for 70 hours, and tensile breaking strength, tensile breaking elongation and hardness were measured.

(d) Oil resistance: According to JIS K 6258, dipping in IRM903 oil of 100% was conducted for 70 hours, and tensile breaking strength, tensile breaking elongation, hardness and volume change were then measured.

(e) Fuel oil resistance: According to JIS K 6258, dipping in Fuel C of 40° C. was conducted for 48 hours, and tensile breaking strength, tensile breaking elongation, hardness and volume change were then measured.

(f) Low-temperature impact brittle test: Measured according to JIS K 6261.

(g) Compression Set $C_S$: According to JIS K 6262, heat treatment was conducted at 100° C. for 22 hours, and a value after 25% compression was measured.

(h): Ozone resistance: Measured according to JIS K 6259. A sample was extended by 20%, and exposed to air atmosphere of 40° C. at an ozone concentration of 50 pphm. Crack was visually estimated.

TABLE 4

|  |  | Example | | |
|---|---|---|---|---|
|  |  | 19 | 20 | 21 |
| Rubber component | R-13 | 30 | | |
|  | R-14 | | 30 | |
|  | R-15 | | | 30 |
|  | R-16 | | | |
|  | R-17 | | | |
|  | N217SH | 70 | 70 | 70 |
| Additives | Carbon black (I) | 60 | 54 | 54 |
|  | Plasticizer (I) | 20 | 20 | 20 |
|  | Stearic acid | 1 | 1 | 1 |
|  | Zinc oxide | 5 | 5 | 5 |
|  | Sulfur (I) | 0.4 | 0.4 | 0.4 |
|  | Vulcanization accelerator (I) | 2 | 2 | 2 |
|  | Vulcanization accelerator (II) | 1 | 1 | 1 |
|  | Vulcanization accelerator (III) | 0.2 | 0.2 | 0.2 |
| Total |  | 189.6 | 183.6 | 183.6 |
| Properties | Mooney viscosity [$ML_{1+4}(100°C.)$] | 60 | 50 | 55 |
|  | Mechanical properties | | | |
|  | $T_B$ (MPa) | 14.0 | 17.1 | 16.1 |
|  | $E_B$ (%) | 460 | 570 | 520 |
|  | $H_A$ (Duro-A) | 69 | 70 | 70 |
|  | Thermal aging test (100° C. × 70 hrs) | | | |
|  | Rate of change of $T_B$ (%) | 6 | 2 | 2 |
|  | Rate of change of $E_B$ (%) | −8 | −18 | −16 |
|  | Change of hardness | 3 | 4 | 4 |
|  | Oil resistance (IRM903, 100° C. × 70 hrs) | | | |
|  | Rate of change of $T_B$ (%) | 5 | 8 | 8 |
|  | Rate of change of $E_B$ (%) | −16 | −9 | −8 |
|  | Change of hardness | 9 | 16 | 15 |
|  | Rate of volume change (%) | −5 | −7 | −6 |
|  | Fuel oil resistance (FUEL C, 40° C. × 48 hrs) | | | |
|  | Rate of change of $T_B$ (%) | −35 | −48 | −46 |
|  | Rate of change of $E_B$ (%) | −19 | −16 | −14 |
|  | Change of hardness | −26 | −20 | −18 |
|  | Rate of volume change (%) | 24 | 19 | 17 |
|  | Low-temperature impact brittle test | | | |
|  | No-failure temperature (° C.) | −22 | −20 | −20 |
|  | Brittle temperature (° C.) | −25 | −24 | −24 |
|  | Compression Set | | | |
|  | $C_s$ (100° C. × 22 hrs) | 27 | 24 | 22 |
|  | Ozone resistance (50 pphm, 40° C. × 200 hrs) | | | |
|  | 20% elongation | NC | NC | NC |
|  | 30% elongation | Cracked at 24 hrs | Cracked at 24 hrs | Cracked at 24 hrs |
|  | 40% elongation | | | |

TABLE 5

|  |  | Example | | |
|---|---|---|---|---|
|  |  | 22 | 23 | 24 |
| Rubber component | R-13 | | | 30 |
|  | R-14 | | | |
|  | R-15 | | | |
|  | R-16 | 30 | | |
|  | R-17 | | 30 | |
|  | N217SH | 70 | 70 | 70 |
| Additives | Carbon black (I) | 60 | 54 | 60 |
|  | Plasticizer (I) | 20 | 20 | 20 |
|  | Stearic acid | 1 | 1 | 1 |
|  | Zinc oxide | 5 | 5 | 5 |
|  | Sulfur (I) | 0.4 | 0.4 | |
|  | Organic peroxide | | | 4 |
|  | Vulcanization accelerator (I) | 2 | 2 | |

TABLE 5-continued

|  |  | Example | | |
|---|---|---|---|---|
|  |  | 22 | 23 | 24 |
|  | Vulcanization accelerator (II) | 1 | 1 |  |
|  | Vulcanization accelerator (III) | 0.2 | 0.2 |  |
| Total Properties | | 189.6 | 183.6 | 189.0 |
|  | Mooney viscosity [$ML_{1+4}(100°C.)$] | 62 | 53 | 60 |
|  | Mechanical properties |  |  |  |
|  | $T_B$ (MPa) | 15.1 | 19.2 | 13.2 |
|  | $E_B$ (%) | 460 | 480 | 400 |
|  | $H_A$ (Duro-A) | 69 | 70 | 70 |
|  | Thermal aging test (100° C. × 70 hrs) |  |  |  |
|  | Rate of change of $T_B$ (%) | 5 | 8 | 6 |
|  | Rate of change of $E_B$ (%) | −15 | −12 | −3 |
|  | Change of hardness | 4 | 3 | 1 |
|  | Oil resistance (IRM903, 100° C. × 70 hrs) |  |  |  |
|  | Rate of change of $T_B$ (%) | 7 | 5 | 5 |
|  | Rate of change of $E_B$ (%) | −16 | −10 | −10 |
|  | Change of hardness | 11 | 16 | 7 |
|  | Rate of volume change (%) | −6 | −7 | −5 |
|  | Fuel oil resistance (FUEL C, 40° C. × 48 hrs) |  |  |  |
|  | Rate of change of $T_B$ (%) | −37 | −44 | −30 |
|  | Rate of change of $E_B$ (%) | −20 | −17 | −18 |
|  | Change of hardness | −26 | −20 | −25 |
|  | Rate of volume change (%) | 20 | 15 | 23 |
|  | Low-temperature impact brittle test |  |  |  |
|  | No-failure temperature (° C.) | −22 | −20 | −20 |
|  | Brittle temperature (° C.) | −25 | −24 | −24 |
|  | Compression Set |  |  |  |
|  | $C_s$ (100° C. × 22 hrs) | 27 | 25 | 22 |
|  | Ozone resistance (50 pphm, 40° C. × 200 hrs) |  |  |  |
|  | 20% elongation | NC | NC | NC |
|  | 30% elongation | NC | NC | Cracked at 24 hrs |
|  | 40% elongation | NC | NC |  |

TABLE 6

|  |  | Comparative Example | | | |
|---|---|---|---|---|---|
|  |  | 7 | 8 | 9 | 10 |
| Rubber component | NE61 | 100 |  |  |  |
|  | N230S |  | 100 |  |  |
|  | N217SH |  |  | 100 |  |
|  | NV72 |  |  |  | 100 |
| Additives | Carbon black (I) | 65 | 65 | 55 | 30 |
|  | Plasticizer (I) | 12 | 20 | 20 | 20 |
|  | Stearic acid | 1 | 1 | 1 | 1 |
|  | Zinc oxide | 5 | 5 | 5 | 5 |
|  | Softening agent | 8 |  |  |  |
|  | Sulfur (I) | 1.2 | 0.35 | 0.35 | 0.35 |
|  | Vulcanization accelerator (II) | 2 | 1.5 | 1.5 | 1.5 |
|  | Vulcanization accelerator (IV) | 0.5 |  |  |  |
|  | Vulcanization accelerator (V) |  | 1.5 | 1.5 | 1.5 |
| Total Properties |  | 194.7 | 194.4 | 184.4 | 159.4 |
|  | Mooney viscosity [$ML_{1+4}(100°C.)$] | 70 | 45 | 60 | 35 |
|  | Mechanical properties |  |  |  |  |
|  | $T_B$ (MPa) | 14.0 | 16.8 | 23.9 | 20.4 |
|  | $E_B$ (%) | 280 | 420 | 610 | 640 |
|  | $H_A$ (Duro-A) | 75 | 68 | 69 | 68 |
|  | Thermal aging test (100° C. × 70 hrs) |  |  |  |  |
|  | Rate of change of $T_B$ (%) | 8 | 14 | −8 | −5 |
|  | Rate of change of $E_B$ (%) | −14 | −7 | −20 | −16 |
|  | Change of hardness | 5 | 4 | 1 | 0 |

TABLE 6-continued

|  |  | Comparative Example | | | |
|---|---|---|---|---|---|
|  |  | 7 | 8 | 9 | 10 |
|  | Oil resistance (IRM903, 100° C. × 70 hrs) |  |  |  |  |
|  | Rate of change of $T_B$ (%) | −44 | −9 | −19 | −6 |
|  | Rate of change of $E_B$ (%) | −46 | −21 | −26 | −11 |
|  | Change of hardness | −20 | 1 | 7 | 4 |
|  | Rate of volume change (%) | 69 | 0 | −7 | −6 |
|  | Fuel oil resistance (FUEL C, 40° C. × 48 hrs) |  |  |  |  |
|  | Rate of change of $T_B$ (%) | −58 | −38 | −41 | −64 |
|  | Rate of change of $E_B$ (%) | −61 | −33 | −28 | −39 |
|  | Change of hardness | −24 | −23 | −17 | −20 |
|  | Rate of volume change (%) | 101 | 44 | 20 | 33 |
|  | Low-temperature impact brittle test |  |  |  |  |
|  | No-failure temperature (° C.) | −44 | −40 | −26 | −24 |
|  | Brittle temperature (° C.) | −47 | −44 | −28 | −25 |
|  | Compression Set |  |  |  |  |
|  | $C_s$ (100° C. × 22 hrs) | 28 | 13 | 11 | 36 |
|  | Ozone resistance (50 pphm, 40° C. × 200 hrs) |  |  |  |  |
|  | 20% elongation | NC | Cracked at 24 hrs | Cracked at 24 hrs | NC |
|  | 30% elongation | NC |  |  | NC |
|  | 40% elongation | NC |  |  | NC |

TABLE 7

|  |  | Comparative Example | | | |
|---|---|---|---|---|---|
|  |  | 11 | 12 | 13 | 14 |
| Rubber component | Super High AN NV | 100 |  |  |  |
|  | AREX117 |  | 100 |  |  |
|  | N217SH |  |  | 95 | 30 |
|  | R-18 |  |  | 5 | 70 |
| Additives | Carbon black (I) | 20 | 85 | 60 | 60 |
|  | Plasticizer (I) | 20 |  | 20 | 20 |
|  | Plasticizer (II) |  | 20 |  |  |
|  | Stearic acid | 1 |  | 1 | 1 |
|  | Zinc oxide | 5 |  | 5 | 5 |
|  | Sulfur (I) | 0.35 |  | 0.4 | 0.4 |
|  | Sulfur (II) |  | 0.3 |  |  |
|  | Vulcanization accelerator (I) |  |  | 2 | 2 |
|  | Vulcanization accelerator (II) | 1.5 |  | 1 | 1 |
|  | Vulcanization accelerator (III) |  |  | 0.2 | 0.2 |
|  | Vulcanization accelerator (V) | 1.5 |  |  |  |
|  | Sodium stearate |  | 2.5 |  |  |
|  | Potassium stearate |  | 0.5 |  |  |
| Total Properties |  | 149.4 | 208.3 | 189.6 | 189.6 |
|  | Mooney viscosity [$ML_{1+4}$(100° C.)] | 42 | 74 | 60 | 60 |
|  | Mechanical properties |  |  |  |  |
|  | $T_B$ (MPa) | 20.0 | 8.9 | 23.0 | 7.8 |
|  | $E_B$ (%) | 610 | 200 | 610 | 400 |
|  | $H_A$ (Duro-A) | 67 | 75 | 69 | 68 |
|  | Thermal aging test (100° C. × 70 hrs) |  |  |  |  |
|  | Rate of change of $T_B$ (%) | 12 | −2 | −10 | 6 |
|  | Rate of change of $E_B$ (%) | −5 | −5 | −20 | −1 |
|  | Change of hardness | 1 | 2 | 2 | 2 |
|  | Oil resistance (IRM903, 100° C. × 70 hrs) |  |  |  |  |
|  | Rate of change of $T_B$ (%) | −11 | −9 | −18 | −10 |
|  | Rate of change of $E_B$ (%) | −11 | −5 | −22 | −7 |
|  | Change of hardness | 14 | 1 | 6 | 1 |
|  | Rate of volume change (%) | −9 | −3 | −5 | −3 |
|  | Fuel oil resistance (FUEL C, 40° C. × 48 hrs) |  |  |  |  |
|  | Rate of change of $T_B$ (%) | −69 | −53 | −43 | −43 |
|  | Rate of change of $E_B$ (%) | −30 | −60 | −30 | −48 |
|  | Change of hardness | −20 | −24 | −18 | −24 |
|  | Rate of volume change (%) | 27 | 76 | 29 | 5 |

TABLE 7-continued

|  |  | Comparative Example | | | |
|---|---|---|---|---|---|
|  |  | 11 | 12 | 13 | 14 |
|  | Low-temperature impact brittle test |  |  |  |  |
|  | No-failure temperature (° C.) | −24 | −24 | −26 | −24 |
|  | Brittle temperature (° C.) | −27 | −25 | −27 | −26 |
|  | Compression Set |  |  |  |  |
|  | $C_s$ (100° C. × 22 hrs) | 44 | 15 | 15 | 30 |
|  | Ozone resistance (50 pphm, 40° C. × 200 hrs) |  |  |  |  |
|  | 20% elongation | NC | NC | Cracked at 24 hrs | NC |
|  | 30% elongation | NC | NC |  | NC |
|  | 40% elongation | NC | NC |  | NC |

TABLE 8

|  |  | Comparative Example | | | |
|---|---|---|---|---|---|
|  |  | 15 | 16 | 17 | 18 |
| Rupper component | AREX117 | 40 |  |  |  |
|  | R-18 |  |  | 30 |  |
|  | R-19 |  |  |  | 30 |
|  | N217SH | 60 |  | 70 | 70 |
|  | TN80 |  | 100 |  |  |
| Additives | Carbon black (I) | 60 |  | 60 | 60 |
|  | Carbon black (II) |  | 20 | 20 | 20 |
|  | Plasticizer (I) | 20 |  |  |  |
|  | Stearic acid |  |  | 1 | 1 |
|  | Zinc oxide |  |  | 5 | 5 |
|  | Magnesium oxide |  | 3 |  |  |
|  | Calcium hydroxide |  | 6 |  |  |
|  | Sulfur (I) | 0.4 |  | 0.4 | 0.4 |
|  | Vulcanization accelerator (I) | 2 |  | 2 | 2 |
|  | Vulcanization accelerator (II) | 1 |  | 1 | 1 |
|  | Vulcanization accelerator (III) | 0.2 |  | 0.2 | 0.2 |
|  | Crosslinking agent (I) |  | 3 |  |  |
|  | Crosslinking agent (II) |  | 2 |  |  |
| Total |  | 183.6 | 134.0 | 189.6 | 189.6 |
| Properties | Mooney viscosity [$ML_{1+4}$(100° C.)] | 55 | 115 | 60 | 64 |
|  | Mechanical properties |  |  |  |  |
|  | $T_B$ (MPa) | 9.7 | 10.4 | 11.8 | 11.8 |
|  | $E_B$ (%) | 500 | 300 | 480 | 410 |
|  | $H_A$ (Duro-A) | 67 | 78 | 68 | 69 |
|  | Thermal aging test (100° C. × 70 hrs) |  |  |  |  |
|  | Rate of change of $T_B$ (%) | 8 | 4 | 8 | 8 |
|  | Rate of change of $E_B$ (%) | −12 | 3 | −10 | −18 |
|  | Change of hardness | 4 | 2 | 4 | 4 |
|  | Oil resistance (IRM903, 100° C. × 70 hrs) |  |  |  |  |
|  | Rate of change of $T_B$ (%) | 5 | −12 | 5 | 4 |
|  | Rate of change of $E_B$ (%) | −24 | −3 | −19 | −19 |
|  | Change of hardness | 10 | −5 | 10 | 9 |
|  | Rate of volume change (%) | −6 | 4 | −6 | −5 |
|  | Fuel oil resistance (FUEL C, 40° C. × 48 hrs) |  |  |  |  |
|  | Rate of change of $T_B$ (%) | −47 | −20 | −37 | −35 |
|  | Rate of change of $E_B$ (%) | −40 | −3 | −19 | −22 |
|  | Change of hardness | −34 | −7 | −28 | −26 |
|  | Rate of volume change (%) | 48 | 8 | 35 | 35 |
|  | Low-temperature impact brittle test |  |  |  |  |
|  | No-failure temperature (° C.) | −24 | −16 | −24 | −24 |
|  | Brittle temperature (° C.) | −26 | −19 | −26 | −26 |
|  | Compression Set |  |  |  |  |
|  | $C_s$ (100° C. × 22 hrs) | 32 | 39 | 29 | 27 |

TABLE 8-continued

|  | Comparative Example | | | |
|---|---|---|---|---|
|  | 15 | 16 | 17 | 18 |
| Ozone resistance (50 pphm, 40° C. × 200 hrs) | | | | |
| 20% elongation | Cracked at 48 hrs | NC | NC | NC |
| 30% elongation |  | NC | Cracked at 24 hrs | Cracked at 24 hrs |
| 40% elongation |  | NC |  |  |

According to the results in Table 6, Comparative Example 7 is an example using the NBR/EPDM alloy only as a rubber component, and the volume change of the vulcanized rubber composition owing to the fuel oil resistance was as high as 101%. Comparative Examples 8 and 9 are examples using NBRs different in acrylonitrile content and Mooney viscosity, and both of them were inferior in ozone resistance. Comparative Example 13 in Table 7 is a vulcanized rubber composition made of the rubber composition similar to Comparative Example 9, and also showed the similar properties. Comparative Examples 10 to 12 are examples using the rubber components outside the range of the present invention, and were slightly higher in volume change of the vulcanized rubber composition owing to fuel oil resistance. In Comparative Example 12, the tensile breaking strength did not reach 10 MPa.

Comparative Example 14 is an example in which acrylic ester-based copolymer rubber (R-18) with the structural unit formulation outside the range of the present invention is used and the contents of the two rubber components are outside the range of the present invention, and the tensile breaking strength was inferior. In Comparative Example 17 in which acrylic ester-based copolymer rubber (R-18) with the structural unit formulation outside the range of the present invention is used and the contents of the two rubber components are within the range of the present invention, the tensile breaking strength was slightly recovered, but the volume change of the vulcanized rubber composition owing to fuel oil resistance was slightly high. Comparative Example 18 also showed the similar properties as Comparative Example 17.

Meanwhile, according to the results in Tables 4 and 5 it is shown that Examples 19 to 24 are excellent because the two rubber components according to the invention were fully co-crosslinked, the tensile breaking strengths were as high as 13.2 to 19.2 MPa and the tensile breaking elongations were 400% or more. The volume changes were relatively low, the oil resistances were excellent, and the balance of various properties such as the low-temperature impact property, compression set and ozone resistance were excellent.

INDUSTRIAL APPLICABILITY

Crosslinking of the acrylic ester-based copolymer rubber of the present invention leads to a vulcanized rubber product having oil resistance and thermal resistance, excellent in fuel oil resistance and mechanical strength and low in compression set. Not only an acrylic ester-based copolymer rubber comprising a structural unit derived from a monomer selected from an acrylic acid alkyl ester and an acrylic acid alkoxyalkyl ester, a structural unit derived from an unsaturated nitrile monomer, and a structural unit derived from a monomer selected from a non-conjugated cyclic polyene and compounds represented by the above general formulas (1) and (2), but also an acrylic ester-based copolymer rubber further comprising a structural unit derived from an epoxy group-containing unsaturated monomer can improve ozone resistance and tensile strength.

In addition, according to the process for producing an acrylic copolymer rubber of the present invention, the acrylic copolymer rubber can easily be produced.

Crosslinking of the rubber composition of the present invention with sulfur and/or an organic peroxide leads to a crosslinked rubber composition having oil resistance and thermal resistance and excellent in fuel oil resistance and tensile strength.

Moreover, the oil-resistant and weather-resistant rubber composition of the present invention can provide a crosslinked rubber composition excellent in ozone resistance, oil resistance, heat resistance and processability and also in tensile strength, tensile breaking elongation and hardness. The oil-resistant and weather-resistant rubber product of the present invention is excellent in ozone resistance, oil resistance, heat resistance and workability because the acrylic ester-based copolymer rubber and the unsaturated nitrile-conjugated diene copolymer are co-crosslinked, and it is also excellent in tensile strength, tensile breaking elongation and hardness with quite a good balance of the properties. Especially, in the case of crosslinking by use of a tetraalkylthiuram disulfide containing an alkyl group having from 2 to 18 carbon atoms, quite a high-performance crosslinked rubber composition can be obtained. Upon making use of these effects, the invention is useful as various hose members such as an oil cooler hose, an air duct hose, a power steering hose, a control hose, an intercooler hose, a tor-con hose, an oil return hose and a heat-resistant hose, a fuel hose member, a seal member such as a bearing seal, a bulk stem seal, various oil seals, an O-ring, a packing and a gasket, various diaphragms, a rubber plate, a belt, an oil level gauge, a coating member such as a hose masking and a piping insulation member, a roll and the like.

The invention claimed is:

1. An oil-resistant and weather-resistant rubber composition comprising (X) an acrylic ester-based copolymer rubber in an amount from 10 to 50% by mass and (Y) an α, β-unsaturated nitrile conjugated diene copolymer in an amount from 90 to 50% by mass (provided (X)+(Y)=100% by mass),
    wherein said acrylic ester-based copolymer rubber is comprised of:
    (A) a structural unit derived from at least one monomer selected from the group consisting of an acrylic acid alkyl ester and an acrylic acid alkoxyalkyl ester in an amount from 40 to 91.9% by mass,
    (B) a structural unit derived from an unsaturated nitrile monomer in an amount from 8 to 40% by mass,
    (C) a structural unit derived from at least one monomer selected from the group consisting of a non-conjugated cyclic polyene and compounds represented by the following formula (1) in an amount from 0.1 to 20% by mass (provided (A)+(B)+(C)=100% by mass), and (D) a structural unit derived from an unsaturated monomer having an epoxy group in an amount from 0.1 to 20 parts by mass when the total of said structural units (A), (B) and (C) is defined as 100 parts by mass, wherein the Mooney viscosity [$ML_{1+4}(100°\ C.)$] is in the range from 10 to 200,

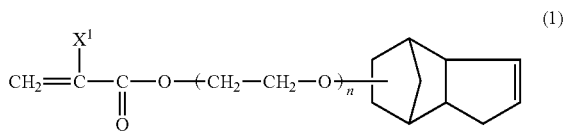

wherein $X^1$ represents a hydrogen atom or a methyl group, and n is an integer from 0 to 10.

2. The oil-resistant and weather-resistant rubber composition according to claim 1, wherein a monomer forming said structural unit (A) is at least one selected from the group consisting of ethyl acrylate, n-butyl acrylate and methoxyethyl acrylate.

3. The oil-resistant and weather-resistant rubber composition according to claim 1, wherein a content of said structural unit (B) is in the range from 10 to 35% by mass.

4. The oil-resistant and weather-resistant rubber composition according to claim 1, wherein (C) is a structural unit derived from at least one non-conjugated cyclic polyene.

5. The oil-resistant and weather-resistant rubber composition according to claim 1, wherein (C) is a structural unit derived from compounds represented by formula (1).

6. The oil-resistant and weather-resistant rubber composition according to claim 1, wherein the Mooney viscosity is from 20 to 100.

* * * * *